United States Patent [19]

Konig

[11] Patent Number: 5,239,555
[45] Date of Patent: Aug. 24, 1993

[54] FREQUENCY HOPPING SIGNAL INTERCEPTOR

[75] Inventor: Charles E. Konig, Staten Island, N.Y.

[73] Assignee: The United States of America as represented by the Secretary of the Army, Washington, D.C.

[21] Appl. No.: 787,475

[22] Filed: Nov. 4, 1991

[51] Int. Cl.[5] .............................................. H04K 1/00
[52] U.S. Cl. ...................................................... 375/1
[58] Field of Search ............................................ 375/1

[56] References Cited

U.S. PATENT DOCUMENTS

| | | | |
|---|---|---|---|
| 4,597,087 | 6/1986 | Kadin | 375/1 |
| 4,752,939 | 6/1988 | Amoroso et al. | 375/1 |
| 4,809,295 | 2/1989 | Zscheile, Jr. et al. | 375/1 |

Primary Examiner—David Cain
Attorney, Agent, or Firm—Michael Zelenka; William H. Anderson

[57] ABSTRACT

An FH interceptor for determining bandwidth, hop number, dwell time, hop rate, channel spacing and hop frequencies. A compressive receiver, having a passband greater than the bandwidth, samples received signals at a scan rate greater than the hop rate. On each scan, the receiver separates the received signal into its frequency components. A histogram memory, connected to the receiver, stores a frequency distribution of the frequency components including the scan periods. A data processor uses the histogram memory to determine the FH parameters.

10 Claims, 1 Drawing Sheet

FREQUENCY HOPPING SIGNAL INTERCEPTOR

GOVERNMENT INTEREST

The invention described herein may be manufactured, used, and licensed by or for the Government for governmental purposes without the payment to me of any royalty thereon.

BACKGROUND OF THE INVENTION

1. Field of the Invention

The present invention relates to spread-spectrum communication systems and, more particularly, to methods and systems for performing interception of frequency hopping (FH) communication signals.

2. Description of the Prior Art

Spread-spectrum modulation techniques involve the spreading of a radio frequency (rf) signal over a relatively wide bandwidth. Typically, such communication signals are greatly increased in bandwidth (spread) by factors of 10 to 10,000 by combining them with binary sequences using several techniques. The result of this spreading has at least two beneficial effects. The first effect is dilution of the signal energy so that while occupying a very large bandwidth, the amount of power density present at any point within the spread signal is very slight. The amount of signal dilution depends on several factors including the width of the spread signal. Such dilution can result in the signal being below the noise floor of a conventional receiver, and thus invisible to it, while it can be received with a spread spectrum receiver. For this reason, spread-spectrum techniques are often used by the military and others in secure communications.

The second beneficial effect of the signal spreading process is that the receiver can reject strong undesired signals, even those much stronger than the desired spread-spectrum signal power density. This is because the desired receiver has a copy of the spreading sequence and uses it to "despread" the signal. Nonspread signals are suppressed in this process. The effectiveness of spread spectrum's interference-rejection property has made it a popular military antijamming technique.

One form of spread-spectrum modulation is frequency hopping (FH); a form of spreading in which the center frequency of a conventional carrier is altered many times a second in accordance with a pseudorandom or pseudonoise (PN) list of channels. The amount of time the signal is present on any single channel, called the dwell time, is very short, commonly less than 10 milliseconds. An important consideration in choosing a PN sequence for a spread-spectrum system is the amount of statistical similarity a sequence has with conventional signals and with PN sequences employed by other spread-spectrum systems. Two code families that have found common usage as PN sequences because they provide large numbers of PN sequences are maximal length codes and Gold codes.

The spectrum of FH signals consists of a carrier that moves pseudorandomly among many channels. As the speed of hopping (hop rate) increases, channels are visited more frequently with less time being spent on a channel. At very fast hopping speeds, significant sidebands can be observed. These sidebands are generated from the pulse-like behavior that the FH signal exhibits at high speeds. The amount of power the FH transmitter delivers per channel is related to how often the channel is visited and the dwell time.

Military personnel and others concerned with the development of rf communications interception systems have long recognized the need for simple, effective systems for intercepting the transmission of FH signals. An ideal FH interceptor system should be capable of detecting and measuring FH signals independently of rf frequency, bandwidth, hop rate, dwell time or number. The present invention fulfills this need.

SUMMARY OF THE INVENTION

The general purpose of this invention is to provide an FH interceptor system and method capable of detecting FH signals independently of rf frequency, band width, hop rate, dwell time and number. To attain this, the present invention contemplates the combination of a receiver capable of intercepting all frequencies of interest and determining the transmitted frequencies, a computer for performing a data analysis to extract the FH parameters, and an FH receiver that uses the FH parameters to intercept and decode the FH transmissions. The present invention encompasses techniques that can be extended to any type and length of PN code used by large communication nets as long as the receiver and digital encoding are matched. Further, no lock-up code or sync time is required.

More specifically, the present invention is an FH interceptor system for intercepting an FH signal to determine the FH parameters of bandwidth (BW), hop number, dwell time, hop rate (H), minimum channel spacing (S), and the set of (n) hop frequencies (Fi) where (i) is an integer from 1 to (n) and (F1), (Fn) are the minimum and maximum frequencies, respectively. The FH interceptor includes a compressive receiver having a passband that includes (BW) for sampling a received signal at a scan rate that is greater than (H) and for separating the received signal into its frequency components (Fi) over a plurality of scan periods. A memory, connected to the compressive receiver, stores the number of occurrances of each of the frequency components (Fi), its time of arrival, and its scan period thereby forming a frequency distribution function. A data processor, connected to the memory, derives from the distribution function the hop frequencies (Fi), (n) from the total number of different frequency components (Fi), (BW) from the difference between (Fn) and (F1), (H) from the ratio of (n) to the minimum time required to receive two successive ones of the same frequency component (Fi), dwell time from the minimum time between successively occurring frequency components (Fi), (S) from the minimum difference between adjacent frequency components (Fi), and the hop number from the time of occurrence of a frequency component (Fi).

BRIEF DESCRIPTION OF THE DRAWINGS

These and other objects, features, and details of the invention will become apparent in light of the ensuing detailed disclosure, and particularly in light of the drawings wherein.

DETAILED DESCRIPTION OF THE PREFERRED EMBODIMENT

In general, an FH signal is generated by digitally modulating continuous wave (CW) signals. The digital modulation is usually performed by a logic circuit that includes a shift register capable of generating a PN coded sequence. As mentioned above, conventional PN encoders usually employ either a maximal length coded sequence or a Gold coded sequence. As is well known by those skilled in these arts, many more coded sequences are available when using a Gold code. The following table compares the number of available maximal length coded sequences with the number of available Gold coded sequences:

| # OF SHIFT REGISTER STAGES | LENGTH OF SPREADING CODE | # OF AVAILABLE SEQUENCES | |
|---|---|---|---|
| | | MAXIMAL LENGTH CODE | GOLD CODE |
| 3 | 7 | 2 | 7 |
| 4 | 15 | 4 | 15 |
| 5 | 31 | 6 | 465 |
| 6 | 63 | 10 | 945 |
| 7 | 127 | 18 | 19431 |
| 8 | 255 | 32 | 30600 |
| 9 | 511 | 56 | 576408 |
| 10 | 1023 | 102 | 1810710 |
| 11 | 2047 | 186 | 31523800 |
| 12 | 4095 | 341 | 42162120 |
| 13 | 8191 | 630 | 1622923785 |

To obtain maximum covertness and increased noise immunity, many FH communication nets use the Gold code. The present invention is capable of intercepting FH transmissions regardless of the type or length of the PN code employed.

Figure 1:
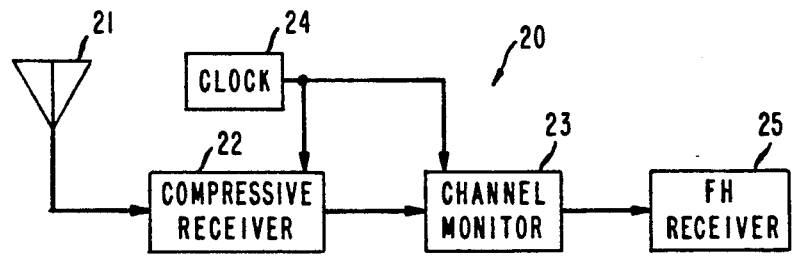
FIG. 1 is a schematic block diagram of the preferred embodiment of the invention.

With reference to FIG. 1, there is shown a block diagram of the FH interceptor system 20 having an antenna 21 connected to the input of a conventional compressive receiver 22 the output of which is connected to the input of a channel monitor 23. A system clock 24 is connected to the receiver 22 and the monitor 23. The output of monitor 23 is connected to an FH receiver 25. In general, the receiver 22 has a relatively wide passband and is capable of receiving FH transmissions via antenna 21 over a predetermined frequency band of interest. Likewise, the FH receiver 25, once given the necessary FH parameters, is capable of receiving FH transmissions in the bandwidth of interest. It is the object of the monitor 23 to determine the necessary FH parameters, i.e. bandwidth (BW), FH tones (Fi), number of tones (n), hop rate (H), dwell time, and tone spacing (S).

Figure 2:
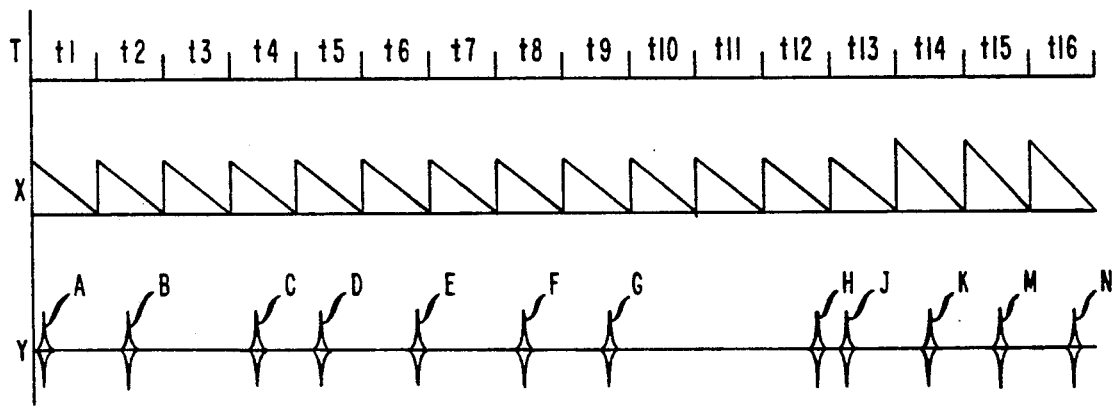
FIG. 2 is a graph of waveforms useful in understanding the invention.

The compressive receiver 22, preferably of conventional configuration, will typically employ a dispersive delay line and a scanning circuit that will sample the output of antenna 21 at a relatively fast scan rate derived from clock 24. The dispersive delay line will separate each of the sampled signals into its frequency components by delaying each frequency component a different amount of time. FIG. 2 illustrates this process. Waveform X illustrates the scan signal of receiver 22 over the time periods T. Waveform Y illustrates a typical output of receiver 22, showing a series of detected frequency components A–N. It is noted that the location of each of the frequency components A–N in its respective time period T will be a function of its frequency. For example, the location of the frequency component A in the time period t1 will indicate the value of the frequency of the component A. Component B, which is located near the center of time period t2, will represent a different frequency than that represented by component A which is located near the start of time period t2. It is noted that for the example illustrated in FIG. 2, the rf signal being intercepted by receiver 22 has no frequency components during time periods t3, t7, t10 and t11.

One possible reason for the absence of a frequency component during a given time period is that a logical zero may have been transmitted by the FH transmitter (where a logical one is represented by the transmission of the next FH tone in the coded sequence and a logical zero is represented by the absence of the transmission of the next FH tone in the coded sequence). Another possible reason for the absence of a frequency component in a particular time period T is that the sampling rate of the receiver 22 may be greater than the hop rate (H) of the FH signal being intercepted thereby causing gaps to appear in waveform Y of FIG. 2. Of course, gaps in waveform Y due to the difference between the FH transmission rate and the sampling rate of receiver 22 will appear cyclically and can be readily detected.

Figure 3:
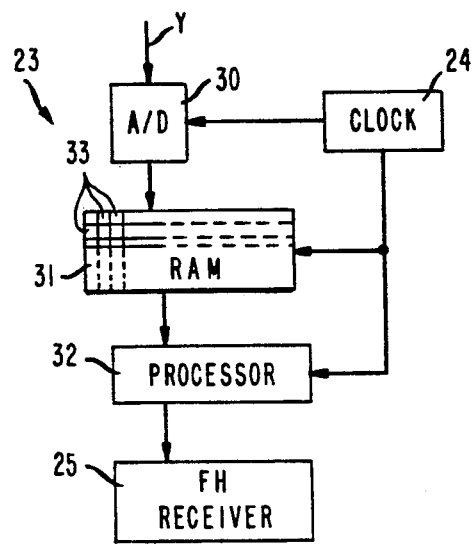
FIG. 3 is a schematic block diagram of a portion of the system shown in FIG. 1.

The channel monitor 23, a data processor system, receives the waveform Y, converts it into appropriate digital data and analyzes the data to extract the rf hop frequencies (Fi), number of frequencies (n), bandwidth (BW), hop rate (H), dwell time, tone spacing (S) and hop number. Monitor 23, shown in detail in FIG. 3, includes an analog-to-digital (A/D) converter 30. The output of receiver 22 (waveform Y) is inputted to A/D 30 which converts each of the frequency components A–N into a digital word representative of the frequency (Fi). The A/D 30 may be implemented using a read only memory (ROM) with a frequency look-up table. The A/D 30, using the time of arrival of the frequency components A–N in their respective time periods T as indicated by the system clock 24, will output a frequency word from the ROM for each component A–N.

The output of A/D 30 is fed to the input of a histogram random access memory (RAM) 31. The system clock 24 is also fed to histogram RAM 31. A frequency distribution function is constructed in histogram RAM 31 by storing a count of the number of times a particular frequency component (Fi) is detected and the time period T in which it occurred To construct the histogram, the RAM 31 is divided into frequency cells 33. Each time that a frequency component (Fi) is outputted from A/D 30, a count is inserted, via clock 24, into its corresponding frequency cell 33 along with a number corresponding to the time period T in which the component (Fi) occurred.

The histogram RAM 31 is connected to a data processor 32 which can now extract from the stored histogram the parameters of the FH transmission. The data processor 32 obtains the hop frequencies (Fi) directly from the stored frequencies in RAM 31. The number (n) of hop frequencies (Fi) is determined by counting the number of frequency cells 33 in RAM 31 that contain a count. The bandwidth (BW) is obtained by subtracting the minimum frequency component (F1) from the maximum frequency component (Fn). The dwell time is determined by searching for the minimum time between the occurrance of two successive frequency components (Fi). The tone spacing is derived from the minimum frequency difference between adjacent frequency components (Fi), and the hop rate (H) is derived from the maximum rate at which the frequency components (Fi) are stored in RAM 31.

To illustrate a specific example, it is assumed that one wishes to intercept transmissions from an FH communications net with a 68 magahertz (MHZ) bandwidth and with 25 kilohertz (KHZ) channel spacing. The net would have available 2720 channels (68/0.025=2720). All of the channels available to the net may be used, or may be broken into sub nets. Assume further that all channels are not used and that each of the FH transmitters in the net uses an eleven-stage shift register to generate a Gold code having a length of 2047 tones. As can be seen from the above table, the FH transmitter can use one of the 31,523,800 available sequences. It is the function of the monitor 23 to determine the bandwidth (68 MHZ), the specific 2,047 tones being used, the tone spacing (25 KHZ) and the hop rate. Once these parameters are found, the FH receiver 25 will then determine the particular code sequence and detect the transmitted intelligence.

In order to be capable of intercepting the FH signals, the receiver 22 should operate at a clock rate that is sufficiently fast to compress no more than one frequency component in a clock period T. For the example given above, the receiver 22 may operate at a rate equal to or greater than the tone spacing (25 KHZ) multiplied by a code length that is equal to or greater than the maximum number of channels (2720) available to the FH transmitter. From the above table it is seen that the next higher code length above 2720 is 4095. The clock rate of receiver 22 may therefore be 102,375 KHZ (25*4095). As such, the compression line of receiver 22 would cover 1/25 KHZ or 40 microseconds. The time-BW product of the receiver 22 would be 10 log (68,000,000)(40)(10)-3 for a 34 db compression gain. The unweighted compressed output pulse would be 1/68,000,000=14.7 microseconds.

The number (n) of frequencies (Fi) present in an intercepted transmission can be counted from the histogram RAM 31 by processor 32. As the receiver 22 scans the band, the histogram RAM 31 continuously fills so that the hop number, hop rate (H) and duration (dwell time) can be determined. Further, the time period T for the arrival of each new frequency component (Fi) is noted and stored in RAM 31. In this way the hop rate (H) is directly determined by processor 32. The number (n) of frequencies present are also counted from the histogram RAM 31.

For example, assume there is an FH signal with a random frequency hopping. It is not know a priori the number (n) of frequencies in the hop chain. Therefore, enough counts must be collected in the histogram RAM 31 to determine with a certain confidence that the number of frequencies present is the RAM 31 is an appropriate number.

The probability that any one frequency cell 33 in histogram RAM 31 contains no frequency counts is given by:

$$P=((N-1)/N)n$$

where n = number of hop frequencies (Fi), and
N = number of frequency cells 33 in RAM 31.

If there are (n) frequencies(Fi) in (N) cells 33, then the expected number of counts in any one cell 33 is n/N. This is a poisson process for which the probability (P) of observing (r) number of counts in any one of the cells 33 is given by:

$$P=(r-p)/p!)e-r$$

where (r) = the expected number of counts in a given cell 33 and (p) is the total number of cells 33 in which there is at least one count.

The probability of one or more counts in all (N) cells 33 is:

$$P=(1-e(-n/N))N$$

To have a confidence (c) that there is at least one count in each cell 33 for each of the frequencies (Fi) we require that 10 the total number of counts (v) equal $(1-e(-n/N))N$. Or that:

$$v=-N \ln(1-e(\ln c)/N)$$

To have a certain confidence level (c), (q) counts have to be collected in the histogram. These mathematical relationships shall be true when q<<N. This implies that as the desired confidence level (c) increases, more total counts (v) are required in the histogram as the number of cells (N) increases. So for an FH signal with (Fi)=128, then 909 counts would be required in the histogram RAM 31 as seen as follows:.

$$q=N \ln(1-e \ln 0.9/128)$$

q = 909.

If all 2720 frequency channels where used as in the above samples, and if (c)=0.9 then n=27631.

The expected number of counts in any one frequency cell 33 is given by:

$$w=e-r=e-n/N$$

Using the above relationship, it is seen that 70% of the cells 33 in the histogram RAM 31 should have counts for an expected count of at least two per cell 33 for those cells having a count. Thus a threshold setting may be placed in processor 32 specifying that at least two counts per cell 33 are necessary for the cell 33 to be considered as storing a valid frequency (Fi).

Each time a valid frequency (Fi) is detected, the time period T is also stored. Since at least two counts per cell 33 are noted for each frequency component (Fi), the hop rate (H) between corresponding components is also determined from the scan number times the scan period divided by the number (n) of frequencies (Fi).

Ideally, the present FH interceptor system 20 will work well where the whole FH communications band can be covered with one compressive receiver 22 having a long dispensive delay for fine frequency resolution. However, in the case where the FH transmission band is greater than the passband of the compressive receiver 22, one or more additional systems, having compressive receivers with adjacent passbands, may be used simultaneously. The data produced by the various systems in this case may be combined into a single computer for analysis.

What is claimed is:

1. A frequency hopping interceptor system for intercepting a frequency hopping signal which includes determining the frequency hopping parameters of bandwidth, hop number, dwell time, hop rate, minimum channel spacing, and a set of hop frequencies containing at least a minimum and a maximum frequencies comprising:
- a compressive receiver means having a passband that includes the bandwidth for sampling a received signal at a scan rate that is greater than the hop rate and for separating said received signal into its frequency components over a plurality of scan periods;
- a memory means connected to said compressive receiver means for storing the number occurrences of each of said frequency components and its scan period; and
- a data processor means connected to said memory means for determining the hop frequencies, the number of frequencies from the total number of different frequency components, the bandwidth from the difference between the maximum frequency and the minimum frequency, the hop rate from the ratio of the number of frequencies to the minimum time required to receive two successive ones of the same frequence component, dwell time from the minimum time between successively occurring frequency components, the channel spacing from the minimum difference between adjacent frequency components, and the hop number from the time of occurrence of a frequency component.

2. The system of claim 1 wherein said memory means stores at least two occurrences of each of said frequency components.

3. The system of claim 1 wherein said memory means has a plurality of storage cells with the number of occurrences of each of said frequency components being stored in a different one of said cells.

4. The system of claim 3 wherein at least seventy percent of the number of said cells have the number of occurrences of each of said frequency components stored therein.

5. The system of claim 4 further including a frequency hopping receiver connected to said data processor means for receiving said frequency hopping signal.

6. A method of intercepting a frequency hopping signal including determining the frequency hopping parameters of bandwidth, hop number, dwell time, hop rate, minimum channel spacing, and a set of hop frequencies containing at least a minimum and a maximum frequencies comprising:
- sampling said frequency hopping signal at a scan rate that is greater than the hop rate to obtain a sampled signal over a plurality of scan periods;
- separating said sampled signal into its frequency components over said scan periods;
- storing the number of occurrences of each of said frequency components and its scan period; and
- determining the hop frequencies, the number of frequencies from the total number of different frequency components, the bandwidth from the difference between the maximum frequency and the minimum frequency, the hop rate from the ratio of the number of frequencies to the minimum time required to receive two successive ones of the same frequency component, dwell time from the minimum time between successively occurring frequency components, the channel spacing from the minimum difference between adjacent components, and the hop number from the time of occurrence of a frequency component.

7. The method of claim 6 wherein said storing step includes storing the number of each of said frequency components at least twice.

8. The method of claim 6 wherein the number of occurrences of each of said frequency components are stored in a plurality of different memory cells.

9. The method of claim 8 wherein at least seventy percent of said cells have the number of occurrences of each of said frequency components stored therein.

10. The method of claim 9 further including receiving said frequency hopping signal with a frequency hopping receiver in accordance with said frequency hopping parameters.

* * * * *